United States Patent
Sanders et al.

(10) Patent No.: US 6,303,038 B1
(45) Date of Patent: Oct. 16, 2001

(54) SOLID MIXTURES OF DIALKYLHYDANTOINS AND BROMIDE ION SOURCES FOR WATER SANITIZATION

(75) Inventors: Michael J. Sanders; Christopher J. Nalepa, both of Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 0 days.

(21) Appl. No.: 09/323,348

(22) Filed: Jun. 1, 1999

(51) Int. Cl.$^7$ .................... C02F 1/72; C02F 1/76
(52) U.S. Cl. .............. 210/754; 210/758; 210/764; 252/175; 252/180; 252/181
(58) Field of Search .................. 210/753, 754, 210/755, 758, 764; 252/175, 180, 181

(56) References Cited

U.S. PATENT DOCUMENTS

| | | | |
|---|---|---|---|
| 3,412,021 | 11/1968 | Paterson | 210/62 |
| 4,123,376 | * 10/1978 | Gray | 252/186.32 |
| 4,532,330 | 7/1985 | Cole | 548/311 |
| 4,621,096 | 11/1986 | Cole | 514/389 |
| 4,677,130 | 6/1987 | Puzig | 514/389 |
| 4,698,165 | 10/1987 | Theyson | 210/755 |
| 5,264,136 | 11/1993 | Howarth et al. | 210/754 |
| 5,422,126 | 6/1995 | Howarth et al. | 424/723 |
| 5,464,636 | * 11/1995 | Hight et al. | 424/661 |
| 5,641,520 | 6/1997 | Howarth et al. | 424/723 |
| 5,662,940 | 9/1997 | Hight et al. | 424/661 |
| 5,780,641 | 7/1998 | Yerushalmi et al. | 548/320.5 |

FOREIGN PATENT DOCUMENTS

| | | |
|---|---|---|
| 1358617 | 7/1974 | (GB) . |
| 9304987 | 3/1993 | (WO) . |
| 9733567 | 9/1997 | (WO) . |
| 9743215 | 11/1997 | (WO) . |

OTHER PUBLICATIONS

MaCalady et al., "Sunlight–Induced Bromate Formation in Chlorinated Seawater", Science, 1977, vol. 195, pp. 1335–1337.

Petterson et al., "N–Halogen Compounds. I. Decomposition of 1,3–Dichloro–5,5–dimethlthydantoin in Water at pH $9^{1}$", J. Org. Chem., 1959, vol. 24, pp. 1414–1419.

* cited by examiner

Primary Examiner—Betsey Morrison Hoey
(74) Attorney, Agent, or Firm—E. E. Spielman, Jr.

(57) ABSTRACT

A water soluble dialkylhydantoin and a source of bromide ion are added to a body of water needing sanitization. This is followed by contacting the body of water with an oxidizing agent, which creates biocidal species in situ in the body of water.

42 Claims, No Drawings

SOLID MIXTURES OF DIALKYLHYDANTOINS AND BROMIDE ION SOURCES FOR WATER SANITIZATION

TECHNICAL FIELD

This invention relates to water sanitzation methods which utilize dialkylhydantoins, bromide ions, and oxidants for bromide ions.

BACKGROUND

There is a need for disinfection and sanitization of a large number of types of bodies of water, including, for example, cooling water systems, pasteurizing systems, waste water effluents, pulp and paper mills, swimming pools, hot tubs, spas, fountains, water attractions, oil fields, air washers, fire reservoirs, and evaporative condensers. In these bodies of water, the growth of bacteria, fungi, algae, slime, and mollusks are undesirable and/or detrimental. Unfortunately, these systems often have ideal conditions for growth of these organisms. Many methods for preventing and killing such growths have been devised.

Many of these methods for sanitizing bodies of water have a drawback. For example, the use of trichloroisocyanuric acid by itself as a sanitizing chemical poses problems because trichloroisocyanuric acid reverts to chloride ion and cyanuric acid upon performing biocidal chemistry; cyanuric acid can build up to levels where the hypochlorite is rendered less effective, causing the phenomenon known as "chlorine lock." Halogenated hydantoins, which are common water-sanitizing chemicals, are notorious for their dusts, which are irritating to human mucous membranes. Hypobromous acid is a desirable biocide because it is known to be more effective than hypochlorous acid at the conditions of most bodies of water needing sanitization. Hypobromous acid is usually produced in situ due to its instability in water. Methods to produce hypobromous acid in situ have included the use of a bromide ion source and an oxidant, such as hypochlorous acid or hypochlorite ion. Further, it is known that the hypobromous acid (or whatever biocidal bromine species is formed) may be stabilized in the presence of a suitable chemical. For example, Mines de Potasse, in GB 1,358,617, use dimethylhydantoin to prolong the life of the biocidal bromine species; the biocidal bromine species only remained for several hours.

Thus, it is clear that there are several unmet needs in known water sanitization methods. A method which either prevents or circumvents chlorine lock is needed. A need exists for a method of dosing halogenated hydantoins to a body of water which minimizes the exposure of the human handler to the halogenated hydantoins. Additionally, a method for stabilizing biocidal bromine species for longer periods of time is also desirable.

SUMMARY OF THE INVENTION

This invention is deemed to satisfy all of these needs in a highly efficient and novel way. The sanitization methods described herein function in bodies of water with conditions corresponding to chlorine lock, do not expose human handlers to halogenated hydantoins, and stabilize biocidal bromine species for periods of weeks.

In one embodiment, this invention provides a method for sanitizing a body of water which comprises introducing into the body of water in the range of from about 0.15 to about 0.70 millimole per liter of a water soluble dialkylhydantoin wherein the alkyl groups are the same or different and each alkyl group contains 1 to about 6 carbon atoms, and in the range of about 0.090 to about 0.39 millimole per liter of a water soluble source of bromide ion. An amount of an oxidizing agent capable of oxidizing the bromide ion in situ is also provided to the body of water.

Another embodiment of this invention entails a method for sanitizing a body of water. The method comprises introducing into the body of water ingredients comprising (i) a composition which itself comprises a solid mixture of a water soluble dialkylhydantoin wherein the alkyl groups are the same or different and each alkyl group contains 1 to about 6 carbon atoms, and a water soluble source of bromide ion, wherein the molar ratio of water soluble dialkylhydantoin to source of bromide ion in the mixture ranges from about 1.2:1 to about 7.2:1, and (ii) an oxidizing agent.

Still another embodiment of this invention provides a method for sanitizing a body of water, the method comprising introducing into the body of water (i) a composition which comprises a solid mixture of a water soluble dialkylhydantoin wherein the alkyl groups are the same or different and each alkyl group contains from 1 to about 6 carbon atoms, and a source of bromide ion, wherein the molar ratio of water soluble dialkylhydantoin to source of bromide ion in the mixture ranges from about 1.2:1 to about 7.2:1, and (ii) an oxidizing agent This method further comprises periodically introducing additional oxidizing agent into the body of water to replenish the content therein of biocidal species.

Yet another embodiment of this invention provides a composition which comprises a solid mixture of (i) a water soluble dialkylhydantoin wherein the alkyl groups are the same or different and each alkyl group contains 1 to about 6 carbon atoms, and (ii) a source of bromide ion, wherein the molar ratio of water soluble dialkylhydantoin to source of bromide ion in the mixture is in the range of about 1.2:1 to about 7.2:1.

A non-exhaustive list of bodies of water that may be sanitized using this invention includes cooling water systems, pasteurizing systems, waste water effluents, pulp and paper mills, swimming pools, hot tubs, spas, fountains, water atttactions, oil fields, air washers, fire reservoirs, and evaporative condensers. Organisms which are destroyed by the practice of this invention include, for example, bacteria, fungi, algae, slime, and mollusks.

Further embodiments of this invention will become apparent from the following detailed description and appended claims.

DETAILED DESCRIPTION OF THE INVENTION

It will now be appreciated that this invention provides, among other things, for the in situ generation of biocidal species for water sanitization. This is accomplished by the addition of a dialkylhydantoin and a source of bromide ion, both at low concentration, to the body of water, in which at least a portion of the body of water is contacted with an oxidizing agent; this system is stable for weeks. It has been found that using lower concentrations of bromide ion than are taught in the prior art yields desirable levels of biocidal activity. Further, it has been observed that the presence of a dialkylhydantoin inhibits the irreversible formation of bromate ion, a possible carcinogen.

In the present invention, the alkyl groups of the dialkylhydantoin may be the same or different, and are both bound to the carbon atom at the 5-position of the hydantoin ring. Suitable alkyl groups include methyl, ethyl, isopropyl, tert-butyl, methylcyclopentyl, cyclohexyl, and the like. Preferred alkyl groups are ethyl and methyl; preferred dialkylhydantoins are 5-ethyl-5-methyl-hydantoin and 5,5-dimethylhydantoin; 5,5-dimethylhydantoin is highly preferred as the dialkylhydantoin moiety. It is desired that the concentration of the added dialkylhydantoin is in the range of from about 0.15 to about 0.70 millimole per liter; the concentration of dialkylhydantoin preferably is in the range of from about 0.50 millimole per liter to about 0.62 millimole per liter.

Bromide ions may be obtained from any convenient source; the source is preferably a solid, and nonhazardous to humans. It is preferred to use water soluble metal bromide salts or water soluble ammonium bromide salts. Examples of water soluble metal bromide salts that may be used include sodium bromide, potassium bromide, magnesium bromide, calcium bromide, and zinc bromide. Tetraethylammonium bromide, tetramethylammonium bromide, and ammonium bromide are examples of water soluble ammonium bromide salts that may be used in the practice of this invention. Sodium bromide is the most highly preferred source of bromide ion. The desired concentration of the source of bromide ion is in the range of from about 0.090 to about 0.39 millimole per liter, with the preferred concentration in the range of from about 0.20 millimole per liter to about 0.35 millimole per liter. Although the source of bromide ion concentration is much lower than previously reported, it is enough to maintain an available halogen concentration of from about 0.5 to about 8 milligrams per liter, expressed as $Br_2$, which is sufficient to keep the body of water sanitary.

The molar ratio of added dialkylhydantoin to added source of bromide ion is typically in the range of from about 1.2:1 to about 7.2:1; a preferred molar ratio is in a range from about 1.5:1 to about 3.2:1.

A wide variety of oxidizing agents may be used, including alkali metal monopersulfates such as potassium monopersulfate, alkali metal peroxides, and chlorine sources; however, the oxidizing agent is preferably a chlorine source. Chlorine sources include $Cl_2$, hypochlorite ions, and hypochlorous acid. More preferably, the chlorine source is a source of hypochlorite ion or hypochlorous acid. Examples of sources of hypochlorite ion and hypochlorous acid include sodium hypochlorite, lithium hypochlorite, calcium hypochlorite, trichloroisocyanuric acid, and sodium dichloroisocyanurate. Preferred hypochlorous acid or hypochlorite ion sources include trichloroisocyanuric acid, sodium dichloroisocyanurate, and calcium hypochlorite, all most preferably in solid form; a highly preferred oxidizing agent is solid trichloroisocyanuric acid.

Contact of the source of bromide ion with the oxidizing agent in the presence of a dialkylhydantoin results in the formation of monohalogenated hydantoins. The monohalogenated hydantoins may act as biocidal agents themselves, or they may store biocidal bromine. For example, hydrolysis of halogenated hydantoins is known to produce hypobromous acid, a well-known biocide. An advantage of this invention is that the monohalohydantoins produced are predominately bromohydantoins; it is well-known that bromoamines are much less irritating to human mucous membranes than are chloroamines, which is particularly useful in certain applications, such as swimming pools. A further advantage of this invention is the inhibition of the formation of bromate ions, a very desirable feature, due to the suspected toxicity of bromate ions, and also because bromate ion formation irreversibly consumes bromide ions.

It is desirable to employ a solid mixture of a dialkylhydantoin and a source of bromide ion. This is especially true when convenient handling is a priority, since sources of bromide ion, especially water soluble bromide salts, may be very deliquescent. Once a hygroscopic salt has absorbed enough moisture, particles of the solid clump together so that it is no longer free-flowing, making it difficult to handle and dose properly to the body of water in need of sanitization. Thus, the use of a solid mixture of dialkylhydantoin and source of bromide ion is advantageous: the mixture is much less deliquescent than that of the unmixed source of bromide ion, and also provides a constant ratio of dialkylhydantoin to source of bromide ion. The constant ratio of dialkylhydantoin to source of bromide ion further prevents blending errors by the user of the solid mixture.

The dialkylhydantoin and source of bromide ion may be added directly to the body of water as solids or either or both may be predissolved in a separate vessel and then added to the body of water. The dialkylhydantoin and source of bromide ion, regardless of form, are added to the body of water needing sanitization simultaneously or in any order. Direct addition of both the dialkylhydantoin and source of bromide ion to the body of water as solids is preferred. When a solid mixture of dialkylhydantoin and source of bromide ion is used, it may be added to the body of water needing sanitization or predissolved in a separate vessel and then added to the body of water. It is preferred to add the solid mixture directly to the body of water.

The oxidizing agent may be added in one or more ways, depending on the setup of the particular system. Adding the oxidant directly to the main body of water is feasible. In systems in which the water is circulated through an apparatus, the oxidant may be added to this apparatus. Highly preferred is the addition of the oxidant to an apparatus through which the water circulates.

Although the dialkylhydantoin and source of bromide ion are regenerated, performing biocidal functions does consume oxidizing agent. In order to maintain about 0.5 to about 8 milligrams per liter of available halogen, expressed as $Br_2$, the oxidant must be replenished periodically (e.g., twice a week). In reality, physical and chemical losses of dialkylhydantoin and source of bromide ion do occur, so they also need occasional replenishment (e.g., once every two weeks). Physical loss pathways for dialkylhydantoins and sources of bromide ion are described in detail in U.S. Pat. No. 5,662,940.

In a highly preferred embodiment, solid sodium bromide and solid dimnethylhydantoin are dissolved in the body of water under conditions of very high dilution. A portion of the water is allowed to contact trichloroisocyanuric acid, which produces hypochlorous acid and/or hypochlorite ion, which in turn produces biocidal species in situ upon contact with bromide ions.

In another highly preferred embodiment, the solid mixture of sodium bromide and dimethylhydantoin is dissolved in the body of water under conditions of very high dilution. A portion of the water is allowed to contact trichloroisocyanuric acid, which produces hypochlorous acid and/or hypochlorite ion, which in turn produces biocidal species in situ upon contact with bromide ions.

In still another highly preferred embodiment of this invention, solid sodium bromide and solid dimethylhydantoin are dissolved under conditions of high dilution in a body of water which has conditions corresponding to chlorine lock. The high concentrations of cyanuric acid and chloride ion that characterize chlorine lock do not affect the ability of bromine biocidal species to sanitize the body of water. A portion of the water is allowed to contact trichloroisocyanuric acid, which produces hypochlorous acid and/or hypochlorite ion, which in turn produces biocidal species in situ upon contact with bromide ions. This thus allows sanitization of the "chlorine-locked" body of water while alleviating the need for draining the body of water.

The following examples are presented for purposes of illustration, and are not intended to impose limitations on the scope of this invention. Examples 1, 2, and 3 demonstrate that dimethylhydantoin stabilization of bromine biocidal species is viable for several weeks. Examples 2 and 3 further demonstrate the presence of monohalohydantoins in the pool water. Example 4 shows the correlation between the loss of dimethylhydantoin and the appearance of bromate ion. Examples 5 and 6 simulate the conditions of chlorine lock, and demonstrate, via the oxidation-reduction potential data, that bromine biocides are effective water sanitizers under such conditions. Examples 4 and 5 also show, via the available bromine measurement, that a lesser amount of bromide ion relative to dimethylhydantoin still provides enough available halogen for biocidal activity.

EXAMPLE 1

Pool A, an above-ground, vinyl-lined swimming pool with a volume of 12,300 gallons, was used in this experiment The water was recirculated with a 1 HP pump through a high rate sand filter on a 12-hour cycle (on at 7:00 am, off at 7:00 pm). Pool A was known to already contain NaBr, so, in the interest of saving water, the concentration was adjusted to 50 ppm by addition of the appropriate amount of solid NaBr. The pool was dosed with 40 ppm dimethylhydantoin by broadcasting the solid to the water. On the suction side of the pump, a portion of the water was diverted through a dedicated calcium hypochlorite feeder, charged with 3", 10 oz. calcium hypochlorite tablets manufactured by PPG Industries. This water was then routed immediately to the bulk pool water. The feeder control valve was adjusted to maintain a residual of 1–2 mg/L total available chlorine, as measured by the diethylphenyldiamine (DPD) colorimetric method. Measurements were made at 1:00 pm daily, and adjustments to the feeder were made accordingly. When necessary, calcium hypochlorite was replenished. Table 1 lists the amount of calcium hypochlorite consumed during a three week period; the total amount of calcium hypochlorite used was 12.5 pounds. The high rate of consumption in the early phases of the test might be attributed to a high organic load, as the pool was recovering from an algal bloom. Nevertheless, when the test was terminated, the pool water was clear and algae-free.

In Examples 2 and 3, a short reverse phase liquid chromatography (LC) guard column was used in the analyses. Initial experiments showed that 1-chloro-3-bromo-5,5-dimethylhydantoin is retained on the LC column when water is the mobile phase. The 1-chloro-3-bromo-5,5-dimethylhydantoin eluted when the mobile phase was switched to acetonitrile/water. Although as little as 5% acetonitrile/water may be used, for these analyses 20% acetonitrile/water was used as the mobile phase.

A Finnigan TSQ 7000 mass spectrometer with an Atmospheric Pressure Chemical Ionization interface was used for liquid chromatography/mass spectroscopy (LC/MS). To confirm that 1-chloro-3-bromo-5,5-dimethylhydantoin could be detected in this analysis, the negative ion mass spectrum was obtained using acetonitile and acetonitrile/water loop injections. The spectrum showed the parent ion-H cluster (M-Br-Cl) centered on m/z 241. In the negative ion mass spectral mode, 1 mg/L 1-chloro-3-bromo-5,5-dimethylhydantion (10 μL injection) can be detected. The monobromohydantoin (M-Br; m/z=161,163), monochlorohydantoin (M-Cl; m/z=205,207), Cl (m/z=35,37), and Br (m/z=79,81) isotopic anions were observed. The M-Br and M-Cl ions were monitored for LC/MS analysis.

The same procedure was used for the 1 ppm 1-chloro-3-bromo-5,5-dimethylhydantoin standard and the samples. After the sample was introduced to the LC column, an excess of the water mobile phase was pumped through the LC column to remove water soluble compounds such as dimethylhydantoin. Next, the mobile phase was changed to 20% acetonitrile/water in order to elute the halodimethylhydantoins. For greater sensitivity in detecting the halodimethylhydantoin moieties from the pool samples, the LC sample size was increased to 100 μL (5×20 μL injections).

EXAMPLE 2

The chemical treatment program of Pool A (described in Example 1) was changed. The calcium hypochlorite was removed from the feeder, and the control valve was closed; the water was not changed. Trichloroisocyanuric acid in the form of 3", 8 oz. tablets was placed in the pool skimmer basket. The number of tablets was adjusted to maintain a residual of 1–2 mg/L total available chlorine as measured by the diethylphenyldiamine (DPD) colorimetric method. Measurements were made at 1:00 pm daily, and adjustments were made accordingly. When necessary, trichloroisocyanuric acid was replenished. Table 1 lists the amount of trichloroisocyanuric acid consumed during a four week period. It can be seen that the consumption of trichloroisocyanuric acid remains fairly constant throughout the test period. Furthermore, the water remained clear and algae-free.

Samples of water from Pool A were removed from the pool at initial phases of the experiment and immediately analyzed by LC/MS. The LC/MS analyses show peaks at m/z=161 and 163 as well as m/z=205 and 207; therefore, monohalodimethylhydantoin compounds are present in the pool water samples. The concentration of halogenated hydantoins for Pool A was 1.8 mg/L, mostly as monobromohydantoin, based on a comparison with an external standard solution of 1-chloro-3-bromo-5,5-dimethylhydantoin.

EXAMPLE 3

A slightly different treatment program was performed on an adjacent pool, Pool B. This was an above-ground, vinyl-lined swimming pool with a volume of 12,300 gallons. The water was recirculated with a 1 HP pump through a high rate sand filter, on a 12 hour cycle (on at 7:00 am, off at 7:00 pm). Pool B was known to already contain NaBr, so, in the interest of saving water, the concentration was adjusted to 50 ppm by addition of the appropriate amount of solid NaBr. The pool was dosed with 40 ppm dimethylhydantoin by broadcasting the solid to the water. On the discharge side of the pump after the filter, a portion of the water was diverted through a dedicated trichloroisocyanuric acid feeder charged with 3" tablets. This water was then routed immediately to the bulk pool water. The feeder control valve was adjusted to maintain a residual of 1–2 mg/L total available chlorine as measured by the diethylphenyldiamine (DPD) colorimetric method. Measurements were made at 1:00 pm daily, and adjustments to the feeder were made accordingly. When necessary, 3" trichloroisocyanuric acid tablets were replenished. Table 1 lists the amount of trichloroisocyanuric acid consumed during an eight week period; the average amount of trichloroisocyanuric acid consumed was 1.8 pounds per week.

Samples of water from Pool B were removed from the pool at initial phases of the experiment and immediately analyzed by LC/MS. The LC/MS analyses show peaks at m/z=161 and 163 as well as m/z=205 and 207; therefore, monohalodimethylhydantoin compounds are present in the pool water samples. The concentration of halogenated hydantoins for Pool B was 4.1 mg/L, mostly as monobromohydantoin, based on a comparison with an external standard solution of 1-chloro-3-bromo-5,5-dimethylhydantoin.

TABLE 1

| week # | Example 1 $Ca(OCl)_2$, lbs. | Example 2 trichloroisocyanuric acid, lbs. | Example 3 trichloroisocyanuric acid, lbs. |
|---|---|---|---|
| 1 | 5.3 | 2.6 | 1.6 |
| 2 | 4.5 | 2.2 | 2.2 |
| 3 | 2.7 | 2.6 | 1.3 |
| 4 | — | 2.6 | 0.4 |
| 5 | — | — | 2.2 |
| 6 | — | — | 1.8 |
| 7 | — | — | 1.3 |
| 8 | — | — | 0.9 |

EXAMPLE 4

Three pools, Pools 1, 2, and 3, were monitored for this experiment; all three pools are in-ground swimming pools with a volume of 20,000 gallons. Every two weeks, each pool was dosed with 12 ppm NaBr and 12 ppm dimethylhydantoin by broadcasting the solids to the water. In all three pools, the oxidant used was trichloroisocyanuric acid. In Pools 1 and 2, the trichloroisocyanuric acid was administered via the skimmer basket; in Pool 3, the trichloroisocyanuric acid was administered via a feeder. A residual of 1–3 mg/L total available chlorine was maintained, as measured by the diethylphenyldiamine (DPD) colorimetric method. Measurements of the available chlorine were made weekly. When necessary, trichloroisocyanuric acid was replenished.

Samples of water were removed from each pool approximately once a week and analyzed. Dimethylhydantoin was monitored by HPLC, while bromate ion and bromide ion were monitored by ion chromatography. Table 2 shows the approximate amounts of dimethylhydantoin, bromate ion, and bromide ion, in parts per million, for each of the three pools.

TABLE 2

| | | | | | | | | | | | | | | |
|---|---|---|---|---|---|---|---|---|---|---|---|---|---|---|
| Pool 1 | day | 1 | 6 | 10 | 18 | 26 | 29 | 36 | 42 | 50 | 57 | 64 | 71 | 73 | 85 |
| | DMH[a] | 44 | 43 | 37 | 30 | 32 | 29 | 29 | 24 | 17 | 14 | 8 | 0 | 27[b] | 17 |
| | bromate | 0 | 0 | 0 | 0 | 0 | 0 | 0 | 0 | 0 | 0 | 1 | 5 | 6 | 6 |
| | bromide | 50 | 35 | 30 | 31 | 34 | 33 | 33 | 32 | 33 | 29 | 30 | 26 | 28 | 23 |
| Pool 2 | day | 1 | 6 | 10 | 18 | 23 | 30 | 36 | 42 | 50 | 57 | 64 | 71 | 78 | 85 |
| | DMH[a] | 33 | 27 | 30 | 29 | 19 | 20 | 14 | 13 | 8 | 3 | 4 | 0 | 26[b] | 28 |
| | bromate | 0 | 0 | 0 | 0 | 0 | 0 | 0 | 0 | 0 | 0 | 1 | 7 | 8 | 15 |
| | bromide | 38 | 20 | 23 | 26 | 29 | 39 | 28 | 36 | 26 | 42 | 27 | 20 | 21 | 20 |
| Pool 3 | day | 1 | — | 10 | 18 | 22 | 30 | 39 | 43 | 50 | 57 | — | — | 74 | 85 |
| | DMH[a] | 52 | — | 43 | 33 | 20 | 23 | 7 | 0 | 4 | 0 | — | — | 2 | 53[b] |
| | bromate | 0 | — | 0 | 0 | 0 | 0 | 6 | 5 | 5 | 7 | — | — | 13 | 12 |
| | bromide | 36 | — | 27 | 34 | 27 | 36 | 20 | 14 | 18 | 15 | — | — | 7 | 9 |

[a]DMH = dimethylhydantoin
[b]more dimethylhydantoin added to pool

EXAMPLE 5

Five vessels, each containing 1000 mL of water, had cyanuric acid added to them to yield concentrations of 7.75×10$^{-5}$, 1.55×10$^{-4}$, 3.88×10$^{-4}$, 7.75×10$^{-4}$, and 3.88×10$^{-3}$ M, respectively. A sixth vessel, also containing 1000 mL of water, did not have any cyanuric acid added. The oxidation-reduction potential of all six solutions was measured using a platinum wire electrode, with Ag/Ag$^-$ as a reference electrode. Enough NaBr was added to each vessel to yield a concentration of 1.94×10$^{-4}$ M; sodium hypochlorite was added to oxidize the bromide ions. After 5 minutes, another measurement of the oxidation-reduction potential of each solution was recorded. A 20 mL aliquot of each solution was then removed, and the available bromine concentration of each solution was determined by iodometric titration with platinum triode. The oxidation-reduction potential in millivolts is shown in Table 2 for each solution, along with the available bromine concentration in ppm.

TABLE 3

(Example 5)

| | | | | | | |
|---|---|---|---|---|---|---|
| cyanuric acid concentration, M | 0 | 7.75 × 10$^{-5}$ | 1.55 × 10$^{-4}$ | 3.88 × 10$^{-4}$ | 7.75 × 10$^{-4}$ | 3.88 × 10$^{-3}$ |
| initial potential, mV | 726.0 | 691.5 | 682.0 | 658.7 | 660.0 | 631.6 |
| potential with NaBr, mV | 766.6 | 773.0 | 772.3 | 764.3 | 752.4 | 714.2 |
| available Br$_2$, ppm | 3.4 | 3.5 | 3.4 | 3.7 | 3.4 | 3.4 |

EXAMPLE 6

Five vessels, each containing 1000 mL of water, had cyanuric acid added to them to yield concentrations of 7.75×10$^{-5}$, 1.55×10$^{-4}$, 3.88×10$^{-4}$, 7.75×10$^{-4}$, and 3.88×10$^{-3}$ M, respectively. A sixth vessel, also containing 1000 mL of water, did not have any cyanuric acid added. The oxidation-reduction potential of all six solutions was measured using a platinum wire electrode, with Ag/Ag$^+$ as a reference electrode. Enough of a 30:70 (wt.) NaBr:dimethylhydantoin solid blend was added to each solution to yield a concentration of 30 ppm of blend (8.74×10$^{-5}$ M NaBr; 1.64×10$^{-4}$ M dimethylhydantoin); sodium hypochlorite was added to oxidize the bromide ions. After 5 minutes, another measurement of the oxidation-reduction potential of each solution was recorded. More of the 30:70 (wt.) NaBr:dimethylhydantoin blend was added to each vessel such that the total concentration of blend was 60 ppm (1.75×10$^{-4}$ M NaBr; 3.28×10$^{-4}$ M dimethylhydantoin). Sodium hypochlorite was again added to oxidize the bromide ions. After 5 minutes, the oxidation-reduction potential of all six solutions was again measured. A 20 mL aliquot of each solution was then removed, and the available bromine concentration of each solution was determined by iodometric titration with platinum triode. Table 3 shows the oxidation-reduction potential in millivolts for each solution, as well as the available bromine concentration in ppm.

TABLE 4

(Example 6)

| cyanuric acid concentration, M | 0 | $7.75 \times 10^{-5}$ | $1.55 \times 10^{-4}$ | $3.88 \times 10^{-4}$ | $7.75 \times 10^{-4}$ | $3.88 \times 10^{-3}$ |
|---|---|---|---|---|---|---|
| initial potential, mV | 720.9 | 685.4 | 678.8 | 667.7 | 657.6 | 619.6 |
| potential with blend* (30 ppm), mV | 625.5 | 641.9 | 647.6 | 647.2 | 646.6 | 623.0 |
| potential with blend* (60 ppm), mV | 591.2 | 611.7 | 615.0 | 623.6 | 618.2 | 600.9 |
| available $Br_2$, ppm | 1.6 | 1.6 | 1.6 | 1.6 | 1.6 | 1.1 |

*30:70 (wt.) NaBr:dimethylhydantoin blend

It is to be understood that the reactants and components referred to by chemical name or formula anywhere in the specification or claims hereof, whether referred to in the singular or plural, are identified as they exist prior to coming into contact with another substance referred to by chemical name or chemical type (e.g., another reactant, a solvent, or etc.). It matters not what preliminary chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together in connection with performing a desired chemical reaction or in forming a mixture to be used in conducting a desired reaction. Accordingly, even though the claims hereinafter may refer to substances, components and/or ingredients in the present tense ("comprises," "is," etc.), the reference is to the substance, component or ingredient as it existed at the time just before it was first contacted, blended or mixed with one or more other substances, components and/or ingredients in accordance with the present disclosure. Whatever transformations, if any, that occur in situ as the catalytic reaction is conducted is what the claim is intended to cover. Thus the fact that a substance, component or ingredient may have lost its original identity through a chemical reaction or transformation during the course of contacting, blending or mixing operations, if conducted in accordance with this disclosure and with the application of common sense and the ordinary skill of a chemist, is thus wholly immaterial for an accurate understanding and appreciation of the true meaning and substance of this disclosure and the claims thereof.

Each and every patent or other publication referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

What is claimed is:

1. A method of santizing a body of water, which method comprises introducing into said body of water in the range of about 0.26 to about 0.70 millimole per liter of a water soluble dialkylhydantoin wherein the alkyl groups are the same or different and each alkyl group contains 1 to about 6 carbon atoms, and in the range of about 0.090 to about 0.38 millimole per liter of a water soluble source of bromide ion selected from the group consisting of metal bromide salts and ammonium bromide salts, and providing to said body of water an amount of an oxidizing agent capable of oxidizing bromide ion in situ.

2. A method according to claim 1 wherein said dialkylhydantoin is 5,5-dimethylhydantoin or 5-ethyl-5-methylhydantoin.

3. A method according to claim 1 wherein said source of bromide ion is a water soluble metal bromide salt or water soluble ammonium bromide salt.

4. A method according to claim 3 wherein said source of bromide ion is sodium bromide.

5. A method according to claim 1 wherein the source of bromide ion and the dialkylhydantoin are added as a solid mixture.

6. A method according to claim 5 wherein the molar ratio of dialkylhydantoin to source of bromide ion is from about 1.2:1 to about 7.2:1.

7. A method according to claim 1 wherein said oxidizing agent is a chlorine source.

8. A method according to claim 7 wherein said chlorine source is selected from the group consisting of a water soluble hypochlorite salt, trichloroisocyanuric acid, or a water soluble salt of trichloroisocyanuric acid.

9. A method according to claim 1 wherein the addition of said dialkylhydantoin, said source of bromide ion and said oxidizing agent to said body of water yields in the range of about 0.5 to about 8 milligrams per liter of total available halogen, expressed as $Br_2$.

10. A method according to claim 1 wherein said body of water is an outdoor swimming pool.

11. A method of sanitizing a body of water, which method comprises introducing into said body of water ingredients comprising:
   (i) a composition which comprises a solid mixture of (a) a water soluble dialkylhydantoin wherein the alkyl groups are the same or different and each alkyl group contains 1 to about 6 carbon atoms, and (b) a source of bromide ion selected from the group consisting of water soluble metal bromide salts and water soluble ammonium bromide salts, wherein the molar ratio of water soluble dialkylhydantoin to source of bromide ion in the mixture ranges from about 1.2:1 to about 7.2:1, and
   (ii) an oxidizing agent;
the amount of said dialkylhydantoin introduced into said body of water being in the range of from about 0.26 to about 0.70 millimole per liter of water.

12. A method according to claim 11 wherein the source of bromide ion is a water soluble metal bromide salt or water soluble ammonium bromide salt.

13. A method according to claim 11 wherein at least (i) is introduced in undissolved form into said body of water.

14. A method according to claim 11 wherein said dialkylhydantoin is 5,5-dimethylhydantoin and said source of bromide ion is sodium bromide.

15. A method according to claim 11 wherein said oxidizing agent is a chlorine source.

16. A method according to claim 15 wherein said chlorine source is selected from the group consisting of a water soluble hypochlorite salt, trichloroisocyanuric acid, or a water soluble salt of trichloroisocyanuric acid.

17. A method according to claim 16 wherein said chlorine source is trichloroisocyanuric acid.

18. A method according to claim 11 wherein the addition of (i) and (ii) to said body of water yields in the range of about 0.5 to about 8 milligrams per liter of total available halogen, expressed as $Br_2$.

19. A method according to claim 11 wherein said dialkylhydantoin is 5,5-dimethylhydantoin, wherein said source of bromide ion is sodium bromide, wherein said oxidizing agent is a chlorine source, and wherein the addition of (i) and (ii) to said body of water yields in the range of about 0.5 to about 8 milligrams per liter of total available halogen, expressed as $Br_2$.

20. A method according to claim 11 wherein said water soluble dialkylhydantoin is 5,5-dimethylhydantoin or 5-ethyl-5-methylhydantoin.

21. A method according to claim 11 wherein said amount of dialkylhydantoin is in the range of from about 0.50 to about 0.62 millimole per liter of water.

22. A method according to claim 21 wherein the addition of (i) and (ii) to said body of water yields in the range of about 0.5 to about 8 milligrams per liter of total available halogen, expressed as $Br_2$.

23. A method according to claim 11 wherein said body of water is an outdoor swimming pool.

24. A method of sanitizing a body of water, which method comprises:

a) introducing into said body of water (i) a composition which comprises a granular mixture of (A) a water soluble dialkylhydantoin wherein the alkyl groups are the same or different and each alkyl group contains 1 to about 6 carbon atoms, and (B) a source of bromide ion selected from the group consisting of water soluble metal bromide salts and water soluble ammonium bromide salts, wherein the molar ratio of water soluble dialkylhydantoin to source of bromide ion in the mixture ranges from about 1.2:1 to about 7.2:1, and (ii) an oxidizing agent, the amount of said dialkylhydantoin introduced into said body of water being in the rant of from about 0.26 to about 0.70 millimole per liter of water, and b) periodically introducing additional oxidizing agent into said body of water.

25. A method according to claim 24 wherein said oxidizing agent is a chlorine source.

26. A method according to claim 24 wherein said chlorine source is selected from the group consisting of a water soluble hypochlorite salt, trichloroisocyanuric acid, or a water soluble salt of trichloroisocyanuric acid.

27. A method according to claim 26 wherein said chlorine source is trichloroisocyanuric acid.

28. A method according to claim 24 wherein said water soluble dialkylhydantoin is 5,5-dimethylhydantoin, said source of bromide ion is sodium bromide, and wherein said oxidizing agent is a chlorine source.

29. A method according to claim 24 wherein the addition of (i) and (ii) to said body of water yields in the range of about 0.5 to about 8 milligrams per liter of total available halogen, expressed as $Br_2$.

30. A method according to claim 24 wherein said dialkylhydantoin is 5,5-dimethylhydantoin, wherein said source of bromide ion is sodium bromide, wherein said oxidizing agent is a chlorine source, and wherein the addition of (i) and (ii) to said body of water yields in the range of about 0.5 to about 8 milligrams per liter of total available halogen, expressed as $Br_2$.

31. A method according to claim 24 wherein the oxidizing agent is introduced into said body of water as required, such that in the range of about 0.5 to about 8 milligrams per liter of total available halogen, expressed as $Br_2$, is maintained within said body of water.

32. A method according to claim 24 wherein said water soluble dialkylhydantoin is 5,5-dimethylhydantoin or 5-ethyl-5-methylhydantoin.

33. A method according to 32 claim wherein said dialkylhydantoin is 5,5-dimethylhydantoin and said source of bromide ion is sodium bromide.

34. A method according to claim 24 wherein the source of bromide ion is a water soluble metal bromide salt or a water soluble ammonium bromide salt.

35. A method according to claim 24 wherein said amount of dialkylhydantoin is in the range of from about 0.50 to about 0.62 millimole per liter of water.

36. A method according to claim 35 wherein the addition of (i) and (ii) to said body of water yields in the range of about 0.5 to about 8 milligrams per liter of total available halogen, expressed as $Br_2$.

37. A method according to claim 24 wherein said body of water is an outdoor swimming pool.

38. A method according to claim 24 wherein at least (i) is introduced in undissolved form into said body of water.

39. A method of sanitizing a body of water, which method comprises introducing into said body of water in the range of from about 0.50 to about 0.62 millimole per liter of a water soluble dialkylhydantoin wherein the alkyl groups are the same or different and each alkyl group contains 1 to about 6 carbon atoms, and in the range of about 0.090 to about 0.38 millimole per liter of a water soluble source of bromide ion selected from the group consisting of metal bromide salts and ammonium bromide salts, and providing to said body of water an amount of an oxidizing agent capable of oxidizing bromide ion in situ.

40. A method according to claim 39 wherein said body of water is an outdoor swimming pool.

41. A method according to claim 39 wherein the molar ratio of water soluble dialkylhydantoin to source of bromide ion is from about 1.2:1 to about 7.2:1.

42. A method according to claim 11 wherein the introduction of said water soluble dialkylhydantoin and said source of bromide ion into said body of water yields in the range of about 0.5 to about 8 milligrams per liter of total available halogen, expressed as $Br_2$.

\* \* \* \* \*

(12) REEXAMINATION CERTIFICATE (4779th)

United States Patent
Sanders et al.

(10) Number: US 6,303,038 C1
(45) Certificate Issued: May 13, 2003

(54) SOLID MIXTURES OF DIALKYLHYDANTOINS AND BROMIDE ION SOURCES FOR WATER CONTAMINATION

(75) Inventors: Michael J. Sanders, Baton Rouge, LA (US); Christopher J. Nalepa, Baton Rouge, LA (US)

(73) Assignee: Albemarle Corporation, Richmond, VA (US)

Reexamination Request:
No. 90/006,183, Jan. 9, 2002

Reexamination Certificate for:
Patent No.: 6,303,038
Issued: Oct. 16, 2001
Appl. No.: 09/323,348
Filed: Jun. 1, 1999

(51) Int. Cl.⁷ ............................ C02F 1/72; C02F 1/76
(52) U.S. Cl. ................ 210/754; 210/758; 210/764; 252/180; 252/175; 252/181

(56) References Cited

U.S. PATENT DOCUMENTS 5,464,636 A * 11/1995 Hight et al. ................ 424/661
5,565,109 A    10/1996 Sweeney ...................... 210/755

FOREIGN PATENT DOCUMENTS

WO    0034186    6/2000

* cited by examiner

*Primary Examiner*—Peter A. Hruskoci

(57) ABSTRACT

A water soluble dialkylhydantoin and a source of bromide ion are added to a body of water needing sanitization. This is followed by contacting the body of water with an oxidizing agent, which creates biocidal species in situ in the body of water.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–42 is confirmed.

* * * * *